(12) United States Patent
Tenpenny

(10) Patent No.: US 9,216,683 B2
(45) Date of Patent: Dec. 22, 2015

(54) VEHICLE SLIDE OUT COVER

(71) Applicant: Jessie Tenpenny, Murfreesboro, TN (US)

(72) Inventor: Jessie Tenpenny, Murfreesboro, TN (US)

( * ) Notice: Subject to any disclaimer, the term of this patent is extended or adjusted under 35 U.S.C. 154(b) by 0 days.

(21) Appl. No.: 14/492,758

(22) Filed: Sep. 22, 2014

(65) Prior Publication Data

US 2015/0084368 A1    Mar. 26, 2015

Related U.S. Application Data

(60) Provisional application No. 61/880,376, filed on Sep. 20, 2013.

(51) Int. Cl.
*B60P 3/34* (2006.01)

(52) U.S. Cl.
CPC ........................................ *B60P 3/34* (2013.01)

(58) Field of Classification Search
CPC ..... E04F 10/005; E04H 15/008; E04H 15/08; B60J 11/00; B60J 11/04; B60P 3/32; B60P 3/34; B60P 3/343
USPC ........ 296/26.03, 26.12, 26.13, 163, 171, 172, 296/173, 175; 160/38, 45, 48, 59, 74, 75; 135/88.01, 88.1, 121
See application file for complete search history.

(56) References Cited

U.S. PATENT DOCUMENTS

| | | | |
|---|---|---|---|
| 5,171,056 A | 12/1992 | Faludy | |
| 6,003,919 A * | 12/1999 | Shook | 296/26.14 |
| 6,269,824 B1 * | 8/2001 | Brutsaert | 135/88.12 |
| 6,619,726 B2 | 9/2003 | Jones | |
| 6,729,679 B1 * | 5/2004 | Malott | 296/175 |
| 7,156,451 B2 | 1/2007 | Verhelst | |
| 7,988,219 B2 | 8/2011 | Young | |
| 8,267,453 B1 * | 9/2012 | Helgesen | 296/26.01 |
| 2004/0135396 A1 | 7/2004 | Corrillo | |
| 2005/0022942 A1 * | 2/2005 | Heitel | 160/22 |
| 2005/0269037 A1 * | 12/2005 | Weddell et al. | 160/22 |
| 2006/0108819 A1 | 5/2006 | Wagner | |
| 2009/0013614 A1 * | 1/2009 | Rogers | 52/66 |

* cited by examiner

*Primary Examiner* — Jason S Daniels
(74) *Attorney, Agent, or Firm* — Daniel Boudwin; Global Intellectual Property Agency LLC

(57) ABSTRACT

A cover assembly for the slide out portion of a recreational vehicle or camper is provided, which is adapted to prevent water and debris from collecting along the upper surface of the slide out portion when extended. The assembly comprises a frame affixed to the vehicle and positioned above the slide out portion thereof. The frame forms a clevis that supports a hingedly attached cover. The cover extends downward and over the slide out portion when the slide out portion is retracted. When extended, the slide out portion forces the cover outward and upward. The cover is sized to rest against the slide out portion and engages its outer, upper edge when fully extended. The cover forms a slanted surface when extended, and then retracts to a substantially vertical state when retracted. A lock secures the cover to the frame between uses and while the vehicle is in motion.

8 Claims, 3 Drawing Sheets

VEHICLE SLIDE OUT COVER

CROSS REFERENCE TO RELATED APPLICATION

This application claims the benefit of U.S. Provisional Application No. 61/880,376 filed on Sep. 20, 2013. The above identified patent application is herein incorporated by reference in its entirety to provide continuity of disclosure.

BACKGROUND OF THE INVENTION

1. Field of the Invention

The present invention relates to protective covers and weatherproofing of slide out campers and recreational vehicles. More specifically, the present invention relates to an articulating, mechanical cover that provides a pitched surface over a slide out section of a camper or recreational vehicle, thereby preventing water pooling or debris collection along the otherwise flat upper surface thereof.

Slide out campers and recreational vehicles provide a means to expand the interior space of the vehicle when parked, increasing space therein while camped out for the night or while making a temporary stop. Slide out vehicles include one or more slide out portions, which are enclosed portions that extend outwards from the sides of the vehicle to increase the interior space thereof. The slide out portions are enclosed and generally comprise an outer surface, upstanding sides, a lower surface, and an upper surface. The side, lower and upper surfaces are disposed within the vehicle when stowed, and are exposed when the slide out portion is extended. The slide out portions are extended to widen the area within the camper walls and increase square footage therein.

One common drawback to this design is that the slide out portions generally have flat roofs or flat upper surfaces. This allows rainwater, leaves and other debris to collect thereon when parked. Any water or debris along this surface impedes the ability of the slide out portion to slide back into its stowed position, and furthermore exposes the vehicle owner to leakage. As with flat roof buildings, pooling water can seep into openings between the slide out portion and the vehicle to create leaks within the vehicle, and moreover cause water damage to the vehicle.

To address this common concern, many owners of this vehicle type employ extendable awnings over the flat upper surface of the slide out portion when extended. Typical awnings are tarpaulin or canvas sheets that are disposed on a roll, wherein the awning is extended by unraveling the roll as the slide out portion is exposed or after it has been extended. The awning can be used to create a pitched surface over the slide out portion to prevent water and debris from collecting thereon. Awnings, however, are prone to damage and tearing over time, and are not an ideal solution.

The present invention relates to a mechanical assembly that articulates with the slide out portion to position a mechanical cover over the upper surface of the slide out portion. When fully extended, the cover forms a pitched surface to direct debris and water away from the slide out portion. The cover articulates from a frame that is supported along the sides of the vehicle. When stowed, the cover is locked against frame such that it does not lift or move while the vehicle is in motion. The use of a mechanical cover is a more robust solution than a canvas or tarpaulin awning, and provides a long-term solution to the issue of maintaining the slide out portions of a recreational vehicle or camper.

2. Description of the Prior Art

Devices have been disclosed in the prior art that relate to protective covers over vehicle slide outs. These include devices that have been patented and published in patent application publications. These devices generally relate to awnings and other covers that are formed in rolls and extended over the otherwise exposed slide out portion upper surface. The following is a list of devices deemed most relevant to the present disclosure, which are herein described for the purposes of highlighting and differentiating the unique aspects of the present invention, and further highlighting the drawbacks existing in the prior art.

One such device in the prior art is U.S. Pat. No. 7,156,451 to Verhelst, which discloses an awning for a vehicle having a slide out portion. The awning extends from a roll and automatically unrolls as the slide-out portion is extended. The end of the awning secures to the slide-out portion and is disposed below the upper corner of the slide-out portion to maintain tension on the awning as the slide-out portion is extended. The outer portion of the awning is supported by a set of two-bar linkages.

Similar to Verhelst is U.S. Pat. No. 7,988,219 to Young, which discloses a roof block that is adapted to be positioned over the awning of a slide-out portion. The roof block fills the gap between the awning and the upper surface of the slide out portion. The Young device contemplates the use of an awning that is supplemented by a physical block. The awning is not disposed at an angle to pitch the upper surface and therefor direct debris away from the slide out portion. The present invention, by contrast, contemplates a mechanical cover that is pitched when fully extended and does not use a flexible awning structure.

Other devices in the art also relate to awnings for slide out portions. These include U.S. Pat. No. 5,171,056 to Faludy, U.S. Pat. No. 6,619,726 to Jones, and U.S. Patent Publication No. 2006/0108819 to Wagner. These devices similarly contemplate a flexible awning that is wound on a roll and unraveled when the slide out portion is extended. The present invention is directed to a mechanical device that is hinged to a frame. The frame is secured to the vehicle and the cover pivots upward and outward when the slide out portion is extended. The cover is comprised of a rigid material and not an awning material for more robust protection and longer service life.

Overall, the present invention substantially diverges in design elements from the prior art, and consequently it is clear that there is a need in the art for an improvement to existing slide out portion covers. In this regard the instant invention substantially fulfills these needs.

SUMMARY OF THE INVENTION

In view of the foregoing disadvantages inherent in the known types of slide out covers now present in the prior art, the present invention provides a new cover in the form of a mechanical assembly, whereby the same can be utilized for providing a slanted cover over the upper surface of an otherwise exposed slide out portion extending from a recreational vehicle or camper vehicle.

It is therefore an object of the present invention to provide a new and improved slide out cover that has all of the advantages of the prior art and none of the disadvantages.

It is another object of the present invention to provide a slide out cover that comprises a mechanical assembly, whereby a frame is affixed to the side of the vehicle and pivotably supports a rigid cover that shrouds the upper surface of the slide out portion when extended.

Another object of the present invention is to provide a slide out cover that comprises a substantially rigid cover that retains a substantially vertical orientation when stowed and an angled orientation when fully extended, thereby providing a slanted upper surface to direct debris and water away from the vehicle.

Yet another object of the present invention is to provide a slide out cover whereby the cover is adapted to engage the upper, outer corner of the slide out portion to pivot the cover upward and outwards when the slide out portion is extended.

Another object of the present invention is to provide a slide out cover that does not employ a flexible awning material in rolled form, but a mechanical cover that pivots from a frame and rests against the upper portion of the slide out portion as it extends.

Another object of the present invention is to provide a slide out cover that is readily installable on existing recreational vehicles and campers, and is sized to extend substantially along the slide out portion length.

Another object of the present invention is to provide a slide out cover that may be readily fabricated from materials that permit relative economy and are commensurate with durability.

Other objects, features and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
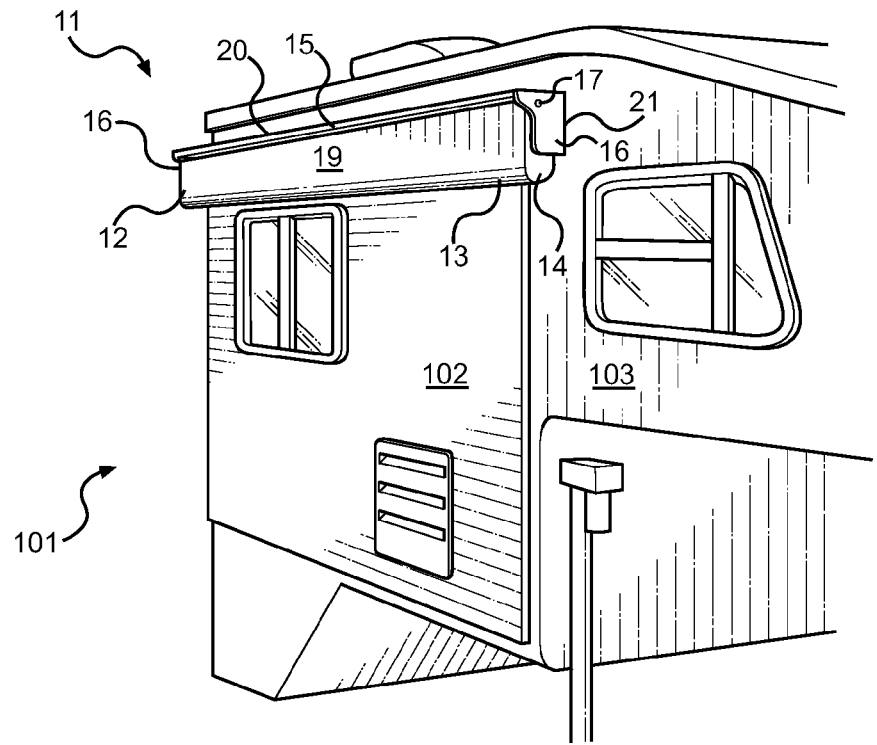
FIG. 1 shows a perspective view of the cover of the present invention in a vertical when the slide out portion is in its stowed condition.

Reference is made herein to the attached drawings. Like reference numerals are used throughout the drawings to depict like or similar elements of the slide out portion cover. For the purposes of presenting a brief and clear description of the present invention, the preferred embodiment will be discussed as used for providing a mechanical assembly that covers the upper surface of a slide out portion to direct water and debris away from the vehicle and the slide out portion. The figures are intended for representative purposes only and should not be considered to be limiting in any respect.

Referring now to FIG. 1, there is shown a perspective view of the slide out portion cover of the present invention in its retracted state. In this state, the slide out portion 101 is retracted and the cover 11 is disposed in a substantially horizontal condition and preferably locked in position. The cover 11 comprises a mechanical assembly comprising a frame 15, a hinge joint 17, and an articulating cover 12 that extends outward and upward when the slide out portion 101 of the vehicle is extended. The frame 15 comprises an upper surface 20, a rear surface 21, and first and second ends 16. The upper surface 20 and rear surface 21 form a substantial L-shaped configuration such that the rear surface 21 is fastened to the vehicle and the upper surface 20 extends outward therefrom. The ends 16 of the frame 11 connect the outer edges of the rear surface 21 and the outer edges of the upper surface 20 together, whereby the ends 16 form an elongated clevis within which the cover 12 is disposed therebetween and hingedly attached thereto.

The frame upper surface 20 of the frame 11 extends substantially the length of the slide out portion 101 while the ends extend downward. The upper surface 20 is preferably slanted downward and graded such that water and debris will not collect thereon. Between the ends 16 is the cover 12, which hingedly attaches to the ends 16 of the frame. The rear surface 21 of the frame is aligned with the outer surface 103 of the vehicle and fastened thereto to secure the frame 15 to the vehicle above the slide out portion 101. The ends 16 of the frame are disposed outward from the forward and rear extent of the slide out portion 101 such that the cover 12 can be sized to extend along the entire length of the slide out 101 and be positioned between the frame ends 16.

The cover 12 freely pivots from the frame via a pin joint 17 and comprises a first and second end 14 adjacent to and parallel to the frame ends 16. The cover 12 further comprises an upper surface 19 and an outer edge 13. The outer edge 13 transitions into a lower lip, whereby the cover 12 comprises an interior volume defined between the ends 14 of the cover, the upper surface 14, and the outer edge 13. The outer edge 13 is adapted to catch the upper, outer edge of the slide out portion outer surface 102 as it is extended away from the vehicle. The outer edge 13 of the cover is therefore a rounded member that forms over the upper, outer edge of the slide out portion 101 so the cover 12 can engage the same to transition the cover from a vertical (stowed) state to a slanted (extended) state.

The cover 12 furthermore comprises a width and a length. The length is defined as the distance between the ends 14 of the cover, and the width is the distance from the outer edge 13 to the inner edge thereof. The width is such that the cover 12 rests at an angle against the slide out portion when the slide out portion 101 is fully extended, and the cover 12 does not restrict or reduce the extent with which the slide out portion 101 may extend. The frame 15 is adapted to be mounted above the slide out portion 101 and along the vehicle such that the cover 12 remains slanted when the slide out portion 101 is fully extended and the cover 12 is bearing thereagainst.

Figure 2:
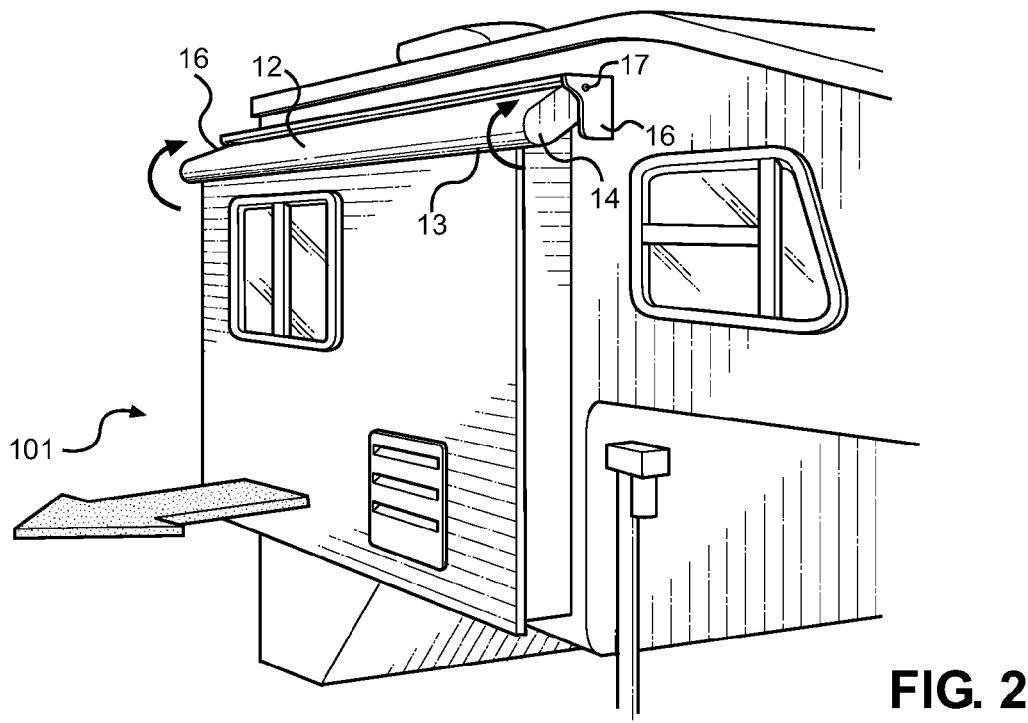
FIG. 2 shows a view of the cover being drawn upward and outwards by the slide out portion as it transitions from a stowed state to an extended state.
Figure 3:
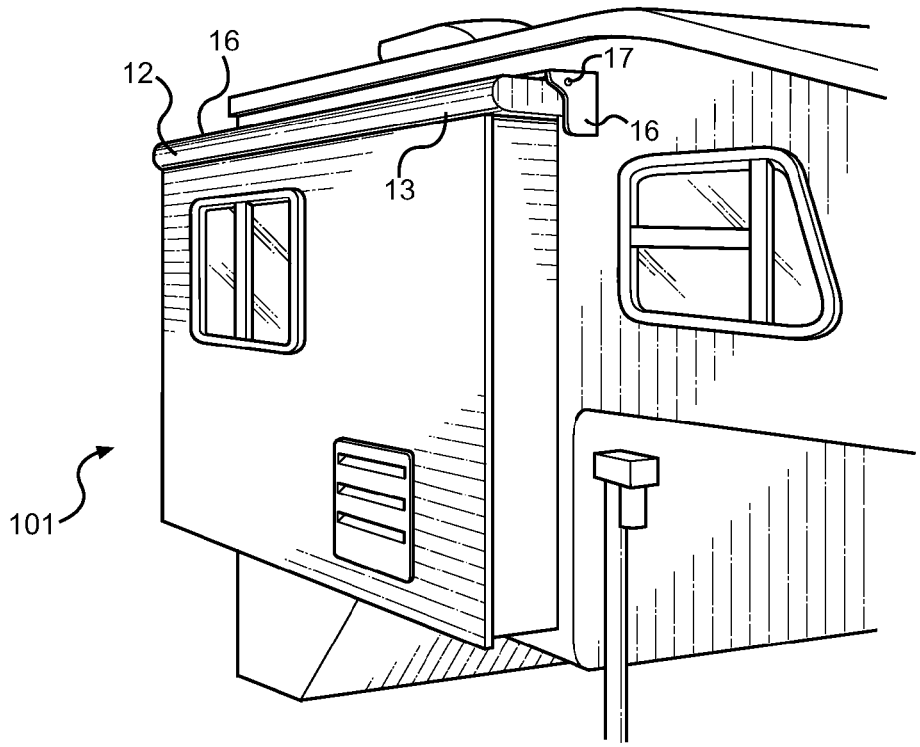
FIG. 3 shows a view of the cover in an extended, working state, providing a slanted upper surface to direct debris and water from the vehicle and away from the slide out portion upper surface.

Referring now to FIGS. 2 and 3, there are shown views illustrating the transition from a stowed state to an extended state, both for the slide out portion 101 and the cover 12. As the slide out portion 101 extends, the outer, upper edge of the slide out portions slides along the interior surface of the cover until it engages the outer edge 13 of the cover. At the point the outer edge of the slide out portion 101 engages the cover 12, the slide out portion is fully extended and the cover is disposed in a downward, slanted angle. The cover pivots from a hinge joint 17, which comprises one or more pinned connections between the cover ends 14 and the ends 16 of the frame.

Figure 4:
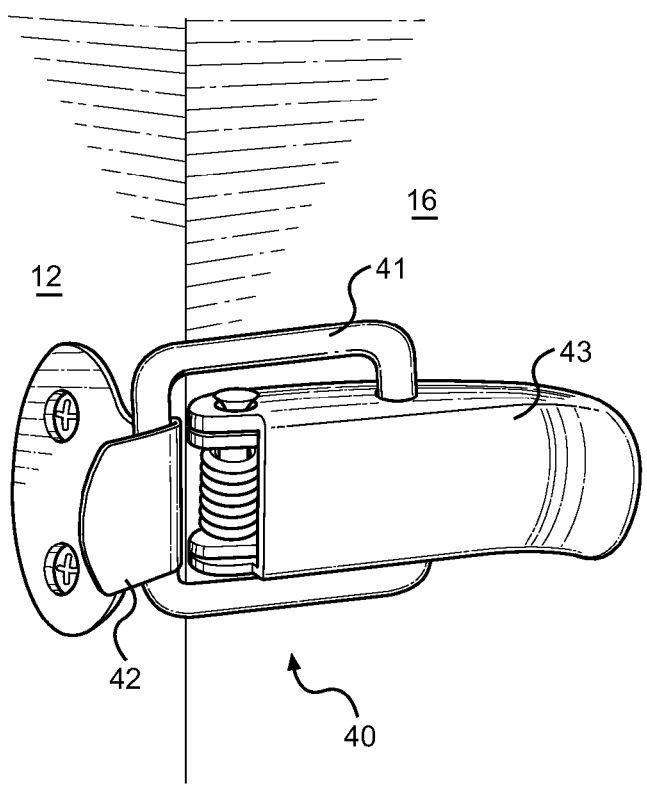
FIG. 4 shows one embodiment of the contemplated lock or retaining element used to secure the cover to its frame when the vehicle is in motion and the slide out portion is retracted.

Referring now to FIG. 4, there is shown one contemplated embodiment of the cover securing lock. The securing lock is a connection between the cover and one or more of the frame ends that prevents the cover from freely pivoted from the frame when the vehicle is in motion and when the slide out portion is retracted. Without such a connection, the air flow over the vehicle while in motion could create a lift on the cover, causing it to pivot upwards and uncontrollably flap and pivot from the frame. A securing lock prevents this unintended motion.

FIG. 4 represents but one configuration of the lock, wherein a latch is provided that extends between the cover 12 and the frame ends 16. Alternative locks include a pin lock, a strap and buckle connection, or any other suitable locking mechanism or element that one skilled in the art would deem suitable for the given application of securing the cover to the frame to prevent unintended movement. The embodiment of FIG. 4 comprises a hinged latch 40 with an elongated hasp 41 that engages a keeper 42. The hasp 41 connects to a spring-mounted handle 43 that is hinged to the frame 16, which is used to place tension on the hasp 41 and draw the keeper 42 toward the hinge joint when the latch 40 is in a locked position. Alternate configurations contemplate the hinge joint on the cover, and altogether different locking configurations.

Figure 5:
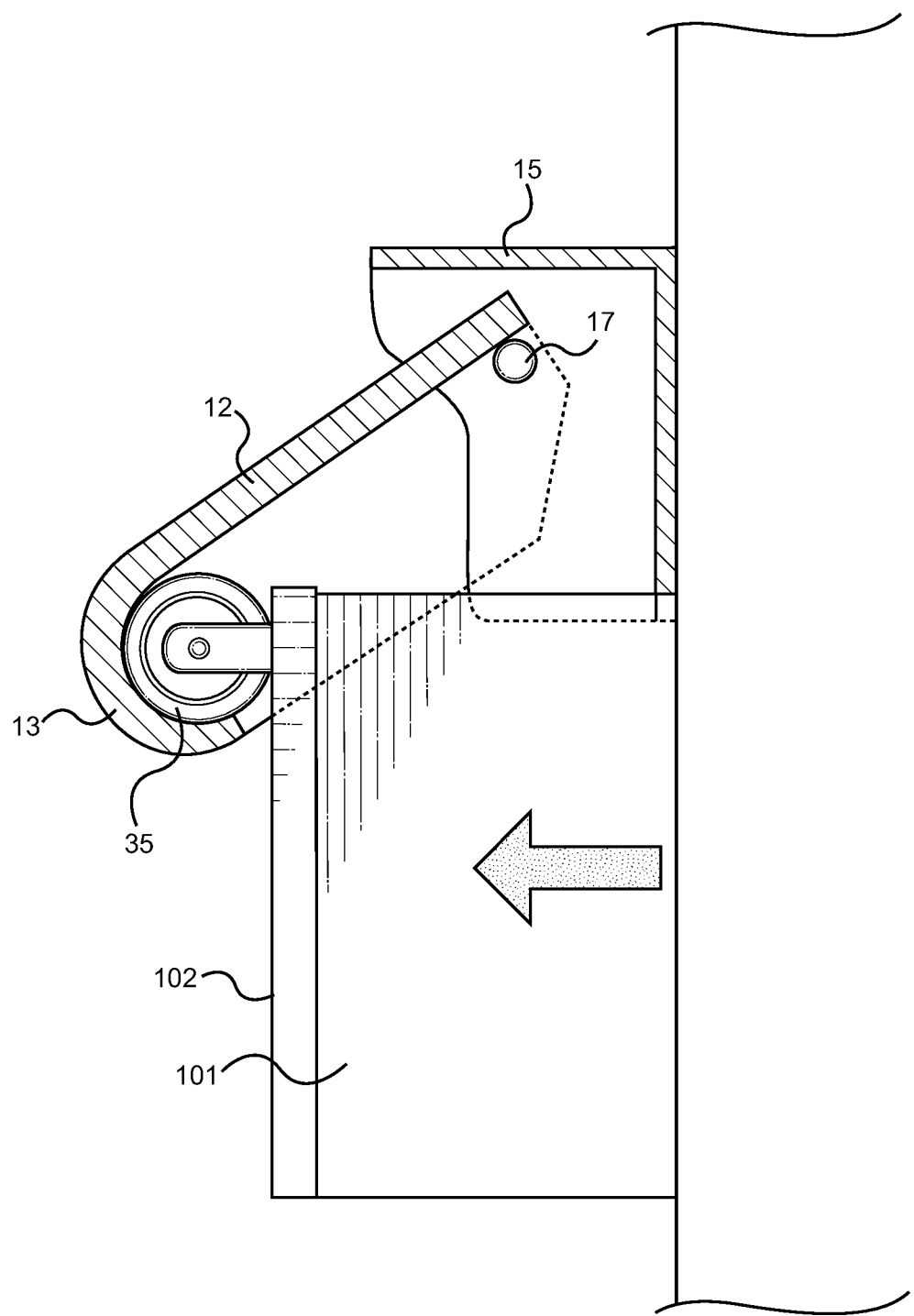
FIG. 5 shows a side view of the cover in an extended state, wherein one or more roller wheels are disposed on the slide out portion to facilitate sliding of the cover thereover.

Referring now to FIG. 5, there is shown a side view of the cover 12 disposed over the slide out portion 101. To facilitate sliding of the cover 12 over the slide out portion 101 when the slide out portion 101 is being extended, it is contemplated that roller wheels 35 be disposed along the slide out portion outer surface 102. This assists the sliding motion of the slide out portion 101 along the inner surface of the cover 12. The cover 12 therefor is pivoted upward and outward from the frame 15 and remains pinned to the hinge joint 17 connection. The roller wheel 35 slides along the underside surface of the cover 12 up to the lower edge 13 thereof, wherein the lower edge 13 is formed to accept the roller wheel 35 therein. The cupped shape of the lower end 13 furthermore engages the wheel 35 to retain the cover 12 against the slide out portion when extended such that the cover 12 cannot rise upwards in this extended state, and the cover 12 and slide out portion 101 remain engaged with one another.

Overall, the present invention provides a mechanical assembly and a substantially rigid cover over a slide out portion, whereby the cover articulates with the slide out portion as it transitions and does not interfere with its range of motion. The present invention is an effective and reliable means of preventing debris and water from collecting along the otherwise exposed upper surface of the slide out portion when extended, and does not require the use of a flexible awning. The present invention is a more streamlined assembly that is more compact and suited for long-term, outdoor use without frequent replacement. Contemplated materials include metallic and plastic materials; however it is not desired to limit the cover or the frame to a specific material type or family of materials other than to specify that the cover is substantially rigid and not a canvas or tarpaulin awning material.

The present invention does not use any electric motors or powered means to extend or retract the cover from the frame. The frame of the assembly is installed on a vehicle above the slide out portion and the cover is hingedly attached thereto. The cover is configured to extend substantially along the slide out portion and be supported in a substantially vertical state over the slide out portion when the slide out portion is retracted. The cover is moved from a stowed (vertical) state to an extended state by using the motion of the slide out portion as motive input. The slide out portion extends the cover upward and outward from the vehicle when the slide out portion is being extended. The cover is then supported by the slide out portion when the slide out portion is in its extended state. This supports the cover at a downward angle over the slide out portion upper surface when the slide out portion is fully extended, thereby directing water and debris away from the vehicle and away from the slide out upper surface.

It is submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A cover for a slide out portion, comprising:
    a frame having frame ends, a rear surface and an upper surface;
    said rear surface and said upper surface forming a substantial L-shape;
    said rear surface and said upper surface having outer edges;
    said frame ends extending between said outer edges of said rear surface and said upper surface;
    a cover comprising an upper surface, cover ends, an inner edge and an outer edge;
    said cover ends being pivotably connected to said frame ends;
    said cover further comprising a width and a length, said length being a distance between said cover ends, and said width being a distance between said inner edge and said outer edge of said cover;
    said frame configured to be affixed to a vehicle and support said cover over a slide out portion, and said length of said cover configured to extend substantially along said slide out portion;
    said outer edge of said cover comprising a rounded shape configured to accept one or more roller wheels disposed along an outer surface of said slide out portion therein when said slide out portion is extended.

2. The cover of claim 1, wherein:
    said cover further comprises an interior volume and said outer edge extends downward from said upper surface;
    said outer edge of said cover is adapted to engage an outer, upper edge of said slide out portion when said slide out portion is full extended and said cover ends are disposed along sides of said slide out portion.

3. The cover of claim 1, wherein the width of said cover is sized to allow full extension of said slide out portion without interference.

4. The cover of claim 1, wherein said upper surface of said frame is slanted downward from said rear surface.

5. The cover of claim 1, wherein said cover is disposed at a downwardly slanting angle when said slide out portion is fully extended.

6. The cover of claim 1, further comprising a lock disposed between said frame and said cover, said locking securing said cover in a substantially downward state and in a static position when engaged.

7. The cover of claim 6, wherein said lock further comprises a latch.

8. The cover of claim 1, wherein said length of said cover is substantially equal or great than a length of the slide out portion.

\* \* \* \* \*